US009142985B2

(12) United States Patent
Arai et al.

(10) Patent No.: US 9,142,985 B2
(45) Date of Patent: Sep. 22, 2015

(54) BATTERY CHARGER FOR PORTABLE ELECTRONIC EQUIPMENT

(75) Inventors: Nobuhiro Arai, Ashikaga (JP); Susumu Yamada, Oizumi-machi (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 572 days.

(21) Appl. No.: 13/078,384

(22) Filed: Apr. 1, 2011

(65) Prior Publication Data
US 2011/0241627 A1 Oct. 6, 2011

(30) Foreign Application Priority Data

Apr. 6, 2010 (JP) ................................. 2010-087598

(51) Int. Cl.
*H02J 7/04* (2006.01)
*H02J 7/00* (2006.01)
*G06F 1/26* (2006.01)
*H02J 9/00* (2006.01)

(52) U.S. Cl.
CPC ................. *H02J 7/0031* (2013.01); *G06F 1/26* (2013.01); *H02J 2007/0062* (2013.01); *H02J 2009/007* (2013.01)

(58) Field of Classification Search
CPC .................................. G06F 3/00; G01R 19/00
USPC ........................... 320/106, 107, 162–164, 159
See application file for complete search history.

(56) References Cited

U.S. PATENT DOCUMENTS

| 5,739,668 | A  | * | 4/1998  | Nishikiori | 320/111 |
|-----------|----|---|---------|------------|---------|
| 6,459,237 | B1 | * | 10/2002 | Bausch     | 320/125 |
| 7,174,408 | B2 | * | 2/2007  | Ede        | 710/306 |
| 7,884,571 | B2 | * | 2/2011  | Veselic    | 320/107 |
| 8,063,606 | B2 | * | 11/2011 | Veselic    | 320/119 |
| 8,575,917 | B2 | * | 11/2013 | Sims et al.| 324/120 |
| 2008/0222438 | A1 | * | 9/2008 | Lin et al. | 713/340 |
| 2010/0181828 | A1 | * | 7/2010 | Handa et al. | 307/9.1 |
| 2010/0228892 | A1 | * | 9/2010 | Chang      | 710/15  |

FOREIGN PATENT DOCUMENTS

JP          2007-60778          3/2007

* cited by examiner

*Primary Examiner* — Edward Tso
*Assistant Examiner* — Johali Torres Ruiz

(57) ABSTRACT

There is offered a battery charger for a portable electronic device that has a simple structure and is capable of detecting that the portable electronic device is connected to the battery charger. A first power supply line is connected to a positive terminal (+) of a rechargeable battery, while a ground line is connected to a negative terminal (−) of the rechargeable battery. An output transistor is connected between the first power supply line and a second power supply line. The output transistor is connected to a Vbus terminal of a USB connector through the second power supply line. A controller outputs a voltage of an H level to the Vbus terminal to detect a change in a voltage at the Vbus terminal, and judges whether the portable electronic device is connected to the USB connector based on a result of the detection. The controller turns the output transistor on when the portable electronic device is judged to be connected to the USB connector.

21 Claims, 6 Drawing Sheets

BATTERY CHARGER FOR PORTABLE ELECTRONIC EQUIPMENT

CROSS-REFERENCE OF THE INVENTION

This application claims priority from Japanese Patent Application No. 2010-087598, the content of which is incorporated herein by reference in its entirety.

BACKGROUND OF THE INVENTION

1. Field of the Invention

This invention relates to a battery charger to charge a rechargeable battery (secondary battery) incorporated in portable electronic equipment through a USB (Universal Serial Bus) interface.

2. Description of the Related Art

In recent years, there has been developed a battery charger to charge a rechargeable battery incorporated in a mobile phone, which is usually kept in a waiting state in a power saving mode and put into an operating state when the mobile phone is connected to the battery charger.

Also, a battery charger to charge a rechargeable battery using a power supply of DC 5 V, which is supplied from a power supply terminal Vbus of the USB that is widely adopted as a serial bus for a personal computer, has come to be adopted in order to increase versatility and to reduce a size and a weight of the battery charger.

Japanese Patent Application Publication No. 2007-60778 discloses a battery charger using the Vbus terminal of the USB, which can provide the battery charger with a sufficient charging current regardless of an amount of current consumed by other peripheral equipment connected to the USB interface.

To save power consumption by the battery charger using the Vbus terminal of the USB described above, how to detect whether the portable electronic equipment such as a mobile phone is connected is an issue.

There is conceived a system which judges that the portable electronic equipment is connected to the battery charger when data communication is performed through the USB interface and certain negotiation is successfully established between the battery charger and the portable electronic equipment.

However, there are problems with the system described above, that is, it requires incorporating a large controller provided with functions to interface with the USB and increases complexity of a structure as well as a cost of the system.

SUMMARY OF THE INVENTION

The invention provides a battery charger for a portable electronic device. The charger includes a power supply, a power supply line connected to the power supply, a ground line connected to the power supply, a USB connector comprising a Vbus terminal, a switching device connected between the power supply line and the Vbus terminal, and a controller configured to perform a first detection to detect a change in a voltage at the Vbus terminal by outputting a first voltage to the Vbus terminal, to judge whether the portable electronic device is connected to the USB connector based on a result of the first detection, and to turn on the switching device when the controller judges that the portable electronic device is connected to the USB connector.

DETAILED DESCRIPTION OF THE INVENTION

Figure 1:
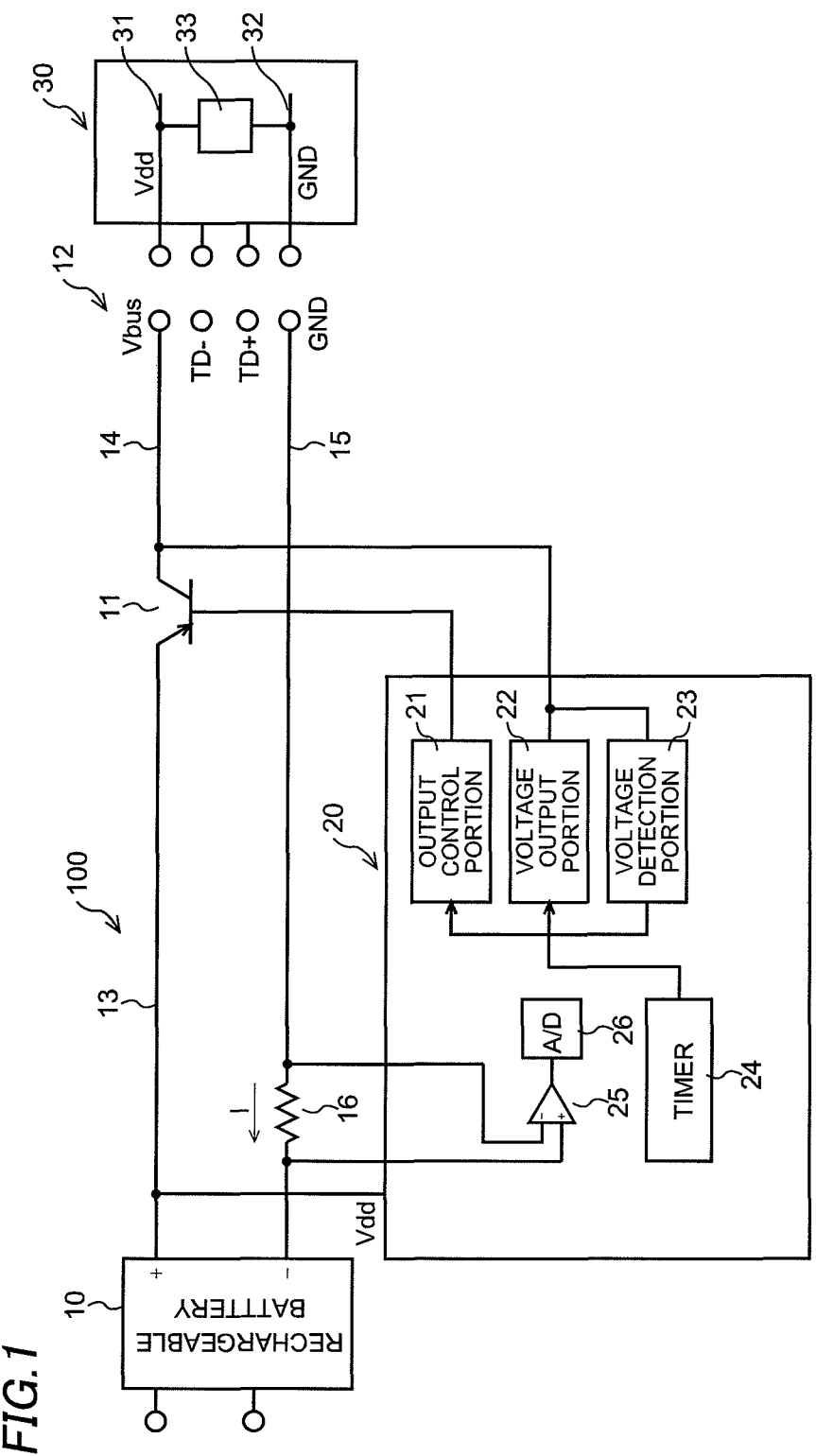
FIG. 1 is a circuit diagram of a battery charger for portable electronic equipment according to a first embodiment of this invention.
Figure 2:
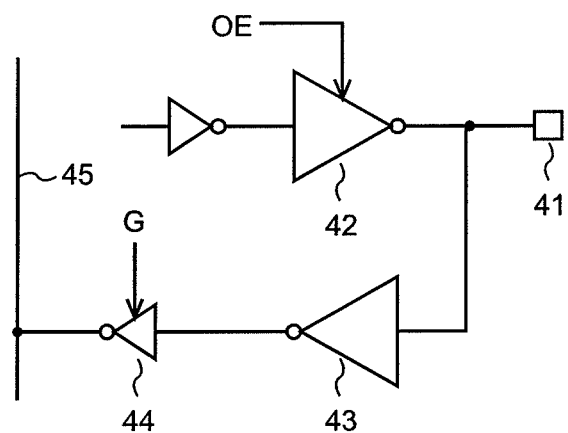
FIG. 2 is an outline circuit diagram of an output control portion and a voltage detection portion.
Figure 3:
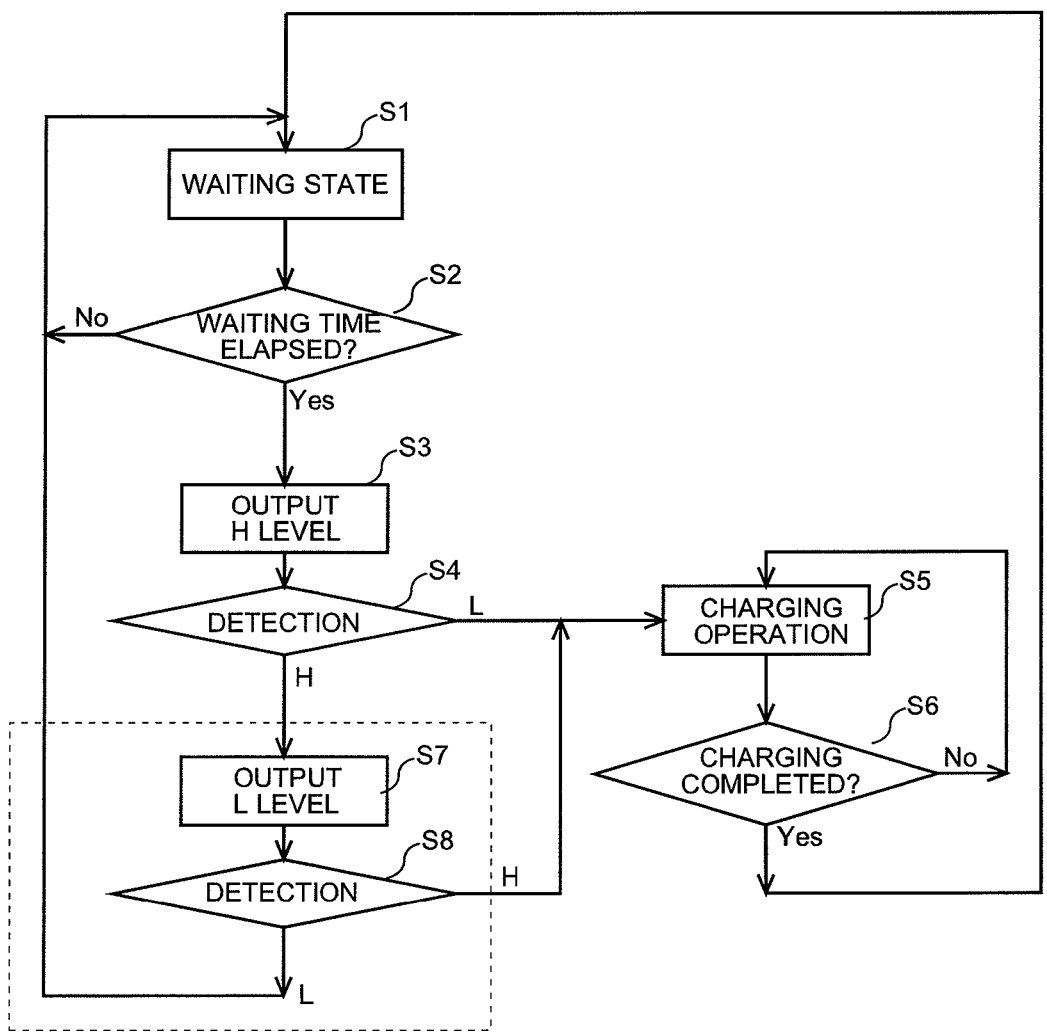
FIG. 3 is a flow chart explaining operations of the battery charger for the portable electronic equipment according to the first embodiment of this invention.

A battery charger 100 for portable electronic equipment (hereafter referred to as a battery charger 100) according to a first embodiment of this invention is hereafter described referring to FIGS. 1-3.

The battery charger 100 is formed to include a rechargeable battery 10 (an example of "power supply" of this embodiment, which may be formed by directly rectifying a commercial alternating current power source), an output transistor 11 (an example of "switching device" of this embodiment), a USB connector 12 and a controller 20. The rechargeable battery 10 is a secondary battery such as a lithium ion battery, and can be charged by another battery charger that rectifies the commercial alternating current power source of AC 100 V and converts into a desired voltage with a DC-DC converter.

One end of a first power supply line 13 is connected to a positive terminal (+) of the rechargeable battery 10, while one end of a ground line 15 is connected to a negative terminal (−) of the rechargeable battery 10. The output transistor 11 is connected between the first power supply line 13 and a second power supply line 14. In this case, the output transistor 11 is a PNP type bipolar transistor.

Another end of the ground line 15 is connected to a GND terminal of the USB connector 12. A current detection resistor 16 to detect a current I is connected between the both ends of the ground line 15.

The USB connector 12 has four terminals that are a Vbus terminal, a TD− terminal, a TD+ terminal and the GND terminal. The Vbus terminal and the GND terminal are power supply-related terminals, while the TD− terminal and the TD+ terminal are data communication terminals. Each of the terminals of the USB connector 12 can be connected to corresponding each of terminals of a USB connector in portable electronic equipment 30 such as a mobile phone through a USB cable.

When the terminals of the USB connector 12 in the battery charger 100 is connected to the terminals of the USB connector in the portable electronic equipment 30 through the USB cable, the Vbus terminal of the USB connector 12 is connected to a power supply line 31 of the portable electronic equipment 30 and the GND terminal of the USB connector 12 is connected to a ground line 32 of the portable electronic equipment 30. A rechargeable battery 33 is connected between the power supply line 31 and the ground line 32 of the portable electronic equipment 30.

An emitter of the output transistor 11 is connected to another end of the first power supply line 13, while a collector of the output transistor 11 is connected to the Vbus terminal of the USB connector 12 through the second power supply line 14. A control signal from an output control portion 21 in the controller 20 is applied to a base of the output transistor 11.

The controller 20 is structured as described below. The controller 20 is formed to include the output control portion 21, a voltage output portion 22, a voltage detection portion 23, a timer 24, a differential amplifier 25 and an A/D converter (analog to digital converter) 26. A voltage from the positive terminal (+) of the rechargeable battery 10 is supplied to the controller 20 as a power supply voltage Vdd.

The timer 24 outputs a timer signal after a lapse of a predetermined period of time that is set in advance. The voltage output portion 22 is structured to output a predetermined voltage to the Vbus terminal of the USB connector 12 through the second power supply line 14 for a certain period of time in response to the timer signal. The voltage detection portion 23 detects a voltage at the Vbus terminal through the second power supply line 14.

The output control portion 21 generates a control signal that controls turning on/off of the output transistor 11 based on results of the detection by the voltage detection portion 23. The voltage detection portion 23 commences an operation to detect the voltage at the Vbus terminal immediately after the voltage output portion 22 terminates outputting the predetermined voltage to the Vbus terminal of the USB connector 12 for the certain period of time.

When the portable electronic equipment 30 is not connected to the USB connector 12, the voltage at the Vbus terminal does not change significantly from the predetermined voltage, since the Vbus terminal is left in an electrically floating state after the voltage output portion 22 terminates outputting the predetermined voltage. Even if there is a change in the voltage at the Vbus terminal, the change occurs very slowly.

When the portable electronic equipment 30 is connected to the USB connector 12, on the other hand, the voltage at the Vbus terminal would change relatively abruptly from the predetermined voltage, although it depends on a state of the portable electronic equipment 30. For example, in the case where the rechargeable battery 33 in the portable electronic equipment 30 is fully discharged and the voltage on the power supply line 31 is 0 V, a current flows from the Vbus terminal to the power supply line 31 so that the voltage at the Vbus terminal is relatively quickly reduced from 3V to 0 V when the voltage output portion 22 outputs 3 V to the Vbus terminal.

Therefore, it is possible to judge whether the portable electronic equipment 30 is connected to the USB connector 12 in the battery charger 100 based on the results of the detection by the voltage detection portion 23, that is, the change in the voltage at the Vbus terminal. In the case where an output impedance of the voltage output portion 22 is relatively high, the voltage at the Vbus terminal may be detected by the voltage detection portion 23 while the predetermined voltage is outputted from the voltage output portion 22 to the Vbus terminal of the USB connector 12.

When the portable electronic equipment 30 is judged to be connected to the USB connector 12 based on the results of the detection by the voltage detection portion 23, the output control portion 21 applies the control signal of an L level to the base of the output transistor 11. With this, the output transistor 11 is turned to an ON state. When the output transistor 11 is turned to the ON state, a voltage (5V, for example) from the positive terminal (+) of the rechargeable battery 10 is outputted to the Vbus terminal of the USB connector 12 through the output transistor 11.

When the portable electronic equipment 30 is judged to be disconnected from the USB connector 12 based on the results of the detection by the voltage detection portion 23, on the other hand, the output control portion 21 applies the control signal of an H level to the base of the output transistor 11. With this, the output transistor 11 is turned to an OFF state. When the portable electronic equipment 30 is in a waiting state in which it is disconnected (step S1 in a flowchart shown in FIG. 3, which is to be described), the output control portion 21 applies the control signal of the H level to the base of the output transistor 11 in order to turn off the output transistor 11.

In the case where the controller 20 is made of a microcomputer, the voltage output portion 22 and the voltage detection portion 23 can be formed of a circuit shown in FIG. 2. The circuit is structured to include an input/output terminal 41, an output buffer 42, an input buffer 43, a bus driver 44 and a bus line 45, as shown in FIG. 2. An output terminal of the output buffer 42 is connected to the input/output terminal 41. An input terminal of the input buffer 43 is also connected to the input/output terminal 41. The input/output terminal 41 is connected to the second power supply line 14.

The output buffer 42 is set to an output enable state when an output enable signal OE is at the H level, and is set to an output disable state, that is, a state in which an output of the output buffer 42 is in a high impedance state, when the output enable signal OE is at the L level.

When the predetermined voltage is to be outputted to the Vbus terminal of the USB connector 12, the output buffer 42 is set to the output enable state for the certain period of time so that the predetermined voltage is outputted from the output buffer 42 to the Vbus terminal through the input/output terminal 41.

When the voltage at the Vbus terminal is to be detected, the voltage at the Vbus terminal is applied to the input terminal of the input buffer 43 through the input/output terminal 41. The output buffer 42 is set to the output disable state at that time. An output signal of the input buffer 43 is outputted to the bus line 45 through the bus driver 44. The bus driver 44 is controlled by a bus drive enable signal G. That is, the bus driver 44 is set to a bus drive enable state when the bus drive enable signal G is at the H level, and is set to a bus drive disable state, that is a state in which an output of the bus driver 44 is in a high impedance state, when the bus drive enable signal G is at the L level. The signal outputted to the bus line 45 is detected by a CPU incorporated in the controller 20.

The current detection resistor 16, the differential amplifier 25 and the A/D converter 26 constitute a current detection circuit to detect the current I flowing through the ground line 15. The current I flows through the ground line 15 when the battery charger 100 is connected to the portable electronic device 30 and placed in a charging operation state. A voltage difference between both ends of the current detection resistor 16 is amplified by the differential amplifier 25. The voltage difference amplified by the differential amplifier 25 is converted into a digital signal with the A/D converter 26. With this, the current I flowing through the ground line 15 can be detected.

While the current I flows when the battery charger 100 charges the rechargeable battery 33 in the portable electronic device 30 as described above, the current I does not flow when the portable electronic device 30 is detached from the battery charger 100. That is, it is possible to judge whether charging of the rechargeable battery 33 is completed, or whether the portable electronic device 30 is detached from the battery charger 100 during the charging, by monitoring the current I with the current detection circuit.

Next, a sequence of the operations of the battery charger 100 is described referring to the flow chart shown in FIG. 3. The sequence of the operations described below can be carried out by executing a program stored in a ROM incorporated in the controller 20 by the CPU incorporated in the controller 20.

First, the output transistor 11 is set to the OFF state by the output control portion 21 in the controller 20 in the waiting state in the step S1. Although the timer 24 is in operation, the other circuits halt their operations and are set in the power saving mode.

The timer 24 outputs the timer signal after a lapse of the predetermined period of time that is set in advance. In a step S2, the controller 20 judges whether the predetermined period of time has elapsed based on the timer signal. When judged that the predetermined period of time has elapsed, the sequence advances from the step S2 to the step S3.

In the step S3, the voltage output portion 22 outputs an H level voltage (3 V, for example) to the Vbus terminal of the USB connector 12 through the second power supply line 14 for the certain period of time.

In a subsequent step S4, the voltage detection portion 23 commences the operation to detect the voltage at the Vbus terminal of the USB connector 12 immediately after the voltage output portion 22 terminates outputting the H level voltage. It is preferable that the output of the voltage output portion 22 is set into the high impedance state when it terminates outputting the H level voltage.

When the voltage detection portion 23 detects the change in the voltage at the Vbus terminal of the USB connector 12, that is, the change from the H level to the L level, the portable electronic device 30 is judged by the controller 20 as being connected to the USB connector 12. In this case, the voltage detection portion 23 is provided with a comparator which compares the voltage at the Vbus terminal with a threshold voltage that is set between the H level and the L level. The voltage at the Vbus terminal is regarded as the H level when it is higher than the threshold voltage, and is regarded as the L level when it is lower than the threshold voltage.

When the voltage detection portion 23 detects the change from the H level to the L level in the voltage at the Vbus terminal of the USB connector 12, the output control portion 21 applies the control signal of the L level to the base of the output transistor 11. With this, the output transistor 11 is turned to the ON state. When the output transistor 11 is turned to the ON state, the voltage (5V, for example) from the positive terminal (+) of the rechargeable battery 10 is outputted to the Vbus terminal of the USB connector 12 through the output transistor 11, and supplied to the power supply line 31 of the portable electronic device 30. With this, the rechargeable battery 33 in the portable electronic device 30 is charged by the battery charger 100 (step S5).

Whether the charging of the rechargeable battery 33 is completed is judged in a subsequent step S6. If it is judged that the charging of the rechargeable battery 33 is completed, the sequence returns to the waiting state in the step S1. Whether the charging of the rechargeable battery 33 is completed can be judged with the current detection circuit using the current detection resistor 16, as described above.

Although the H level voltage is outputted to the Vbus terminal of the USB connector 12 in the step S3 and the voltage at the Vbus terminal is detected in the step S4, there is a case in which the voltage on the power supply line 31 is high and not much different from the H level voltage at the Vbus terminal, depending on the state of the rechargeable battery 33 in the portable electronic device 30. Since the change in the voltage at the Vbus terminal is small in this case, there is a possibility that the portable electronic device 30 is mistakenly judged as being disconnected from the battery charger 100 in spite of the fact that it is connected.

Therefore, it is preferable to provide additional steps S7 and S8. That is, the voltage output portion 22 outputs an L level voltage (0 V, for example) to the Vbus terminal of the USB connector 12 through the second power supply line 14 for the certain period of time in the step S7. Immediately after the voltage output portion 22 terminates outputting the L level voltage, the voltage detection portion 23 commences the operation to detect the voltage at the Vbus terminal of the USB connector 12 in the subsequent step S8. At that time also, the output of the voltage output portion 22 is set into the high impedance state when it terminates outputting the L level voltage.

When the voltage detection portion 23 detects the change in the voltage at the Vbus terminal of the USB connector 12, that is, the change from the L level to the H level, the portable electronic device 30 is judged by the controller 20 as being connected to the USB connector 12. By adding the steps S7 and S8 described above, the connection of the portable electronic device 30 can be detected even when the voltage on the power supply line 31 is high due to the state of the rechargeable battery 33 in the portable electronic device 30. That is because the voltage at the Vbus terminal varies from the L level to the H level in this case.

The output transistor 11 is not limited to the bipolar transistor, and may be a MOS transistor.

Since the connection of the portable electronic device 30 is detected based on the change in the voltage at the Vbus terminal of the USB connector 12 in a system using the battery charger 100 as described above, it is made possible to simplify a structure and to reduce a cost of the system compared with the conventional system with which the connection of the portable electronic device is detected by performing the data communication between the battery charger and the portable electronic device through the USB interface.

Figure 4:
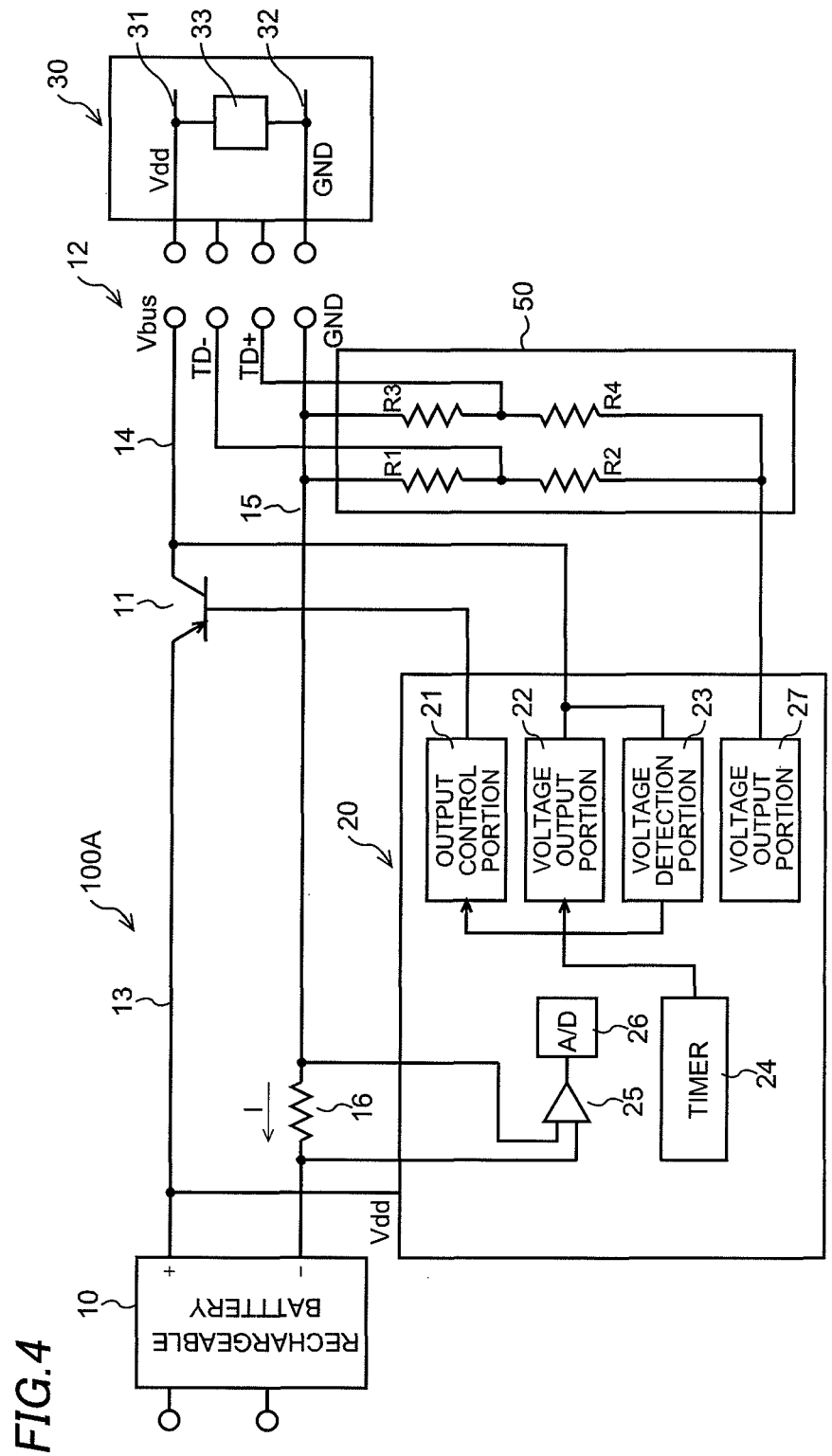
FIG. 4 is a circuit diagram of a battery charger for portable electronic equipment according to a second embodiment of this invention.

Next, a battery charger 100A according to a second embodiment of this invention is described referring to FIG. 4. The battery charger 100A has functions to charge an IPOD (a portable digital electronic device designed and marketed by Apple Incorporated, which is a registered trademark of Apple Incorporated) in addition to the functions of the battery charger 100 according to the first embodiment. In this case, the portable electronic device 30 means the IPOD portable digital electronic device. Therefore, the controller 20 is provided with a resistance bridge circuit 50 and a voltage output portion 27 to output a voltage (5 V, for example) to the IPOD portable digital electronic device, which is the portable 10 electronic device 30 in the second embodiment.

To charge the IPOD portable digital electronic device, it is generally required that the TD− terminal and the TD+ terminal of the USB connector 12 are set to predetermined voltages. For that purpose, there is provided the resistance bridge circuit 50 that includes resistors R1 and R2 connected in series and resistors R3 and R4 connected in series. A voltage at a connecting node between the serially-connected 15 resistors R1 and R2 is outputted to the TD− terminal, while a voltage at a connecting node between the serially-connected resistors R3 and R4 is outputted to the TD+ terminal.

One end of each of the resistors R1 and R3 is connected to the GND terminal of the USB connector 12. In this case, the connection of the portable electronic device 30 can be not detected if one end of each of the resistors R2 and R4 is connected to the Vbus terminal. That is because a current path is formed from the Vbus terminal to the GND terminal through the serially-connected resistors R1 and R2 and the like, and the voltage at the Vbus terminal can be not set by the voltage output portion 22.

Therefore, the controller 20 is provided with the voltage output portion 27 for the IPOD portable digital electronic device, an output voltage of which is applied to the connecting node between the resistors R2 and R4. With this, the connection of the IPOD portable digital electronic device can be detected correctly when the IPOD portable digital electronic device is to be charged.

Figure 5:
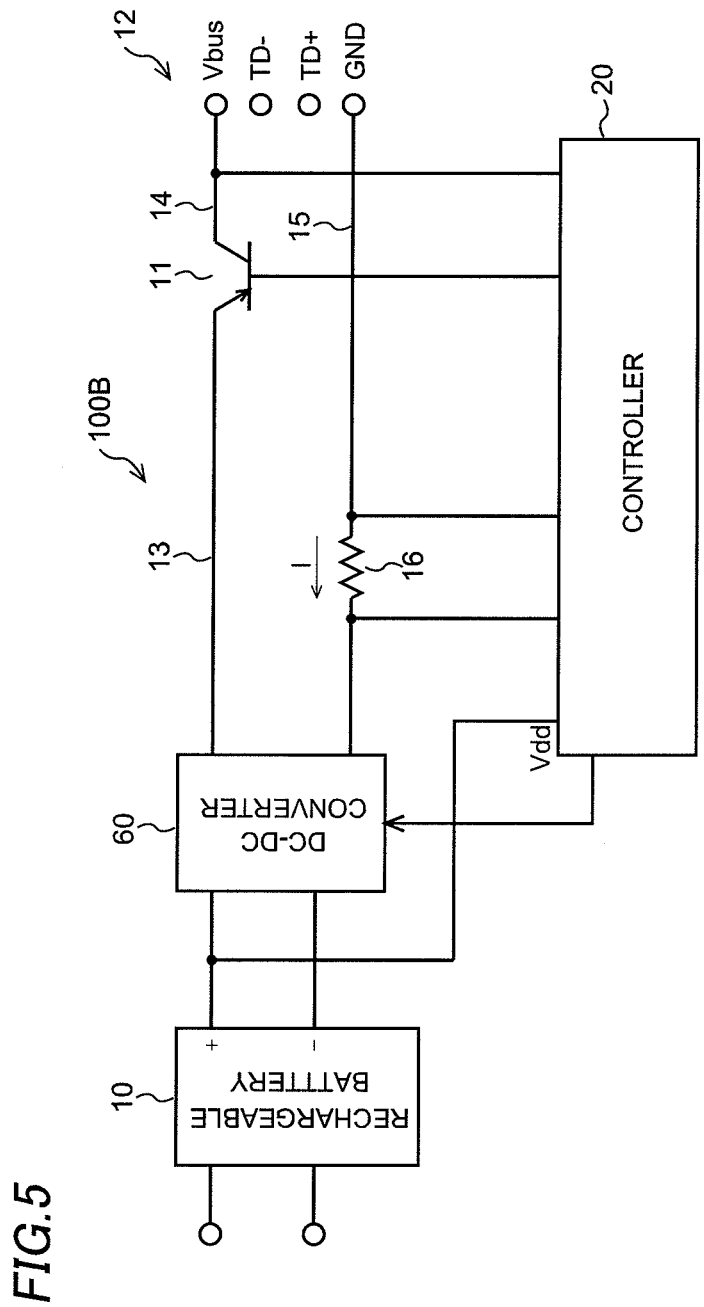
FIG. 5 is a circuit diagram of a battery charger for portable electronic equipment according to a third embodiment of this invention.

Next, a battery charger 100B according to a third embodiment of this invention is described referring to FIG. 5. The battery charger 100B is formed by adding a DC-DC converter 60 to the battery charger 100 according to the first embodiment, and is configured so that the controller 20 controls operations of the DC-DC converter 60.

The positive terminal (+) and the negative terminal (−) of the rechargeable battery 10 are connected to input terminals of the DC-DC converter 60 that converts an output voltage of the rechargeable battery 10 into a desired voltage. The output voltage of the DC-DC converter 60 is applied to the Vbus terminal through the output transistor 11.

In the waiting state (step S1) shown in the flowchart of FIG. 3, the DC-DC converter 60 is placed in an operation halt state by the control signal from the controller 20. With this, a power consumption of the DC-DC converter 60 in the waiting state is reduced.

The output transistor 11 is turned to the ON state by the output control portion 21 when the voltage detection portion 23 in the controller 20 judges that the portable electronic device 30 is connected to the USB connector 12. The DC-DC converter 60 is put into operation at that time by the control signal from the controller 20. With this, the output voltage of the DC-DC converter 60 is applied to the Vbus terminal of the USB connector 12.

Figure 6:
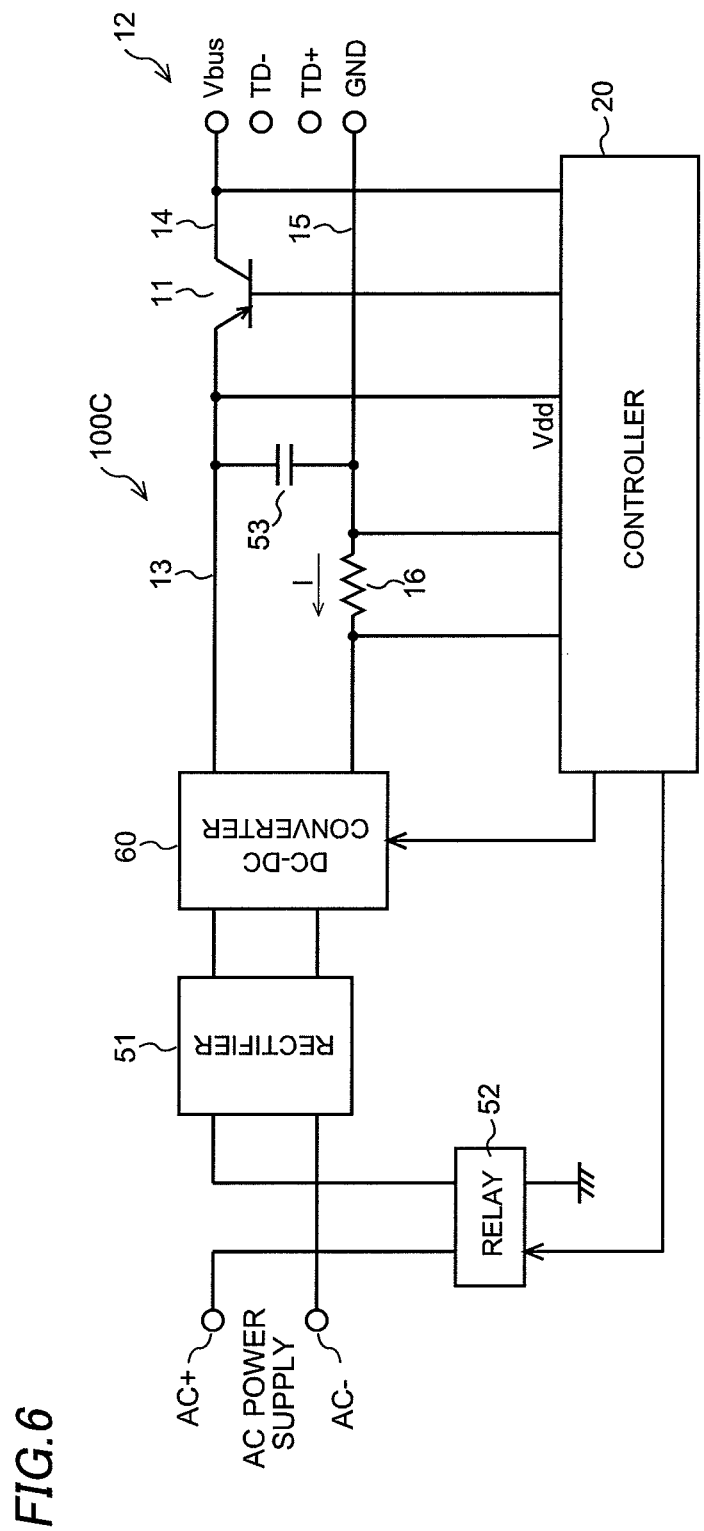
FIG. 6 is a circuit diagram of a battery charger for portable electronic equipment according to a fourth embodiment of this invention.

Next, a battery charger 100C according to a fourth embodiment of this invention is described referring to FIG. 6. The battery charger 100C is formed by adding the DC-DC converter 60, a rectifier 51, a relay 52 and a backup capacitor 53 to the battery charger 100 according to the first embodiment, and is configured so that the controller 20 controls operations of the DC-DC converter 60 and the relay 52. The DC-DC converter 60, the rectifier 51 and the relay 52 form a power supply for charging, while the backup capacitor 53 is connected between the first power supply line 13 and the ground line 15 to form a power supply for the controller 20.

The relay 52 makes a switching circuit to turn on/off a power supply voltage of AC 100 V that is a commercial alternating current power source. The power supply voltage of AC 100 V inputted through an AC+ terminal and an AC− terminal (AC plugs) is provided to the rectifier 51 when the relay 52 is turned on.

The rectifier 51 rectifies the power supply voltage of AC 100 V provided through the relay 52. The DC-DC converter 60 converts an output voltage of the rectifier 51 into a predetermined DC voltage as well as smoothing the output voltage of the rectifier 51. The backup capacitor 53 is charged by an output of the DC-DC converter 60 and serves as the power supply for the controller 20 in the waiting state (S1) shown in FIG. 3.

That is, the controller 20 operates on the voltage of the backup capacitor 53 in the waiting state (S1) shown in the flowchart of FIG. 3. The controller 20 turns on the relay 52 to put the rectifier 51 and the DC-DC converter 60 into operation to charge the backup capacitor 53, only when the voltage of the backup capacitor 53 is reduced to a voltage lower than a predetermined voltage. With this, it is made possible to reduce power consumption of the battery charger 100C in the waiting state.

When the relay 52 is turned off, in particular, the power consumption of the battery charger 100C in the waiting state can be reduced to virtually zero, because the controller 20 operates using the voltage of the backup capacitor 53 as its power supply voltage and the DC-DC converter 60 halts its operation.

When the voltage detection portion 23 in the controller 20 judges that the portable electronic device 30 is connected to the USB connector 12, the controller 20 turns the output transistor 11 into the ON state as well as turning the relay 52 into an ON state so that the DC-DC converter 60 commences its operation. With this, the output voltage of the DC-DC converter 60 is applied to the Vbus terminal of the USB connector 12.

With the battery charger according to the embodiments of this invention, it is made possible with the simple structure to detect that the portable electronic device is connected to the battery charger and to put the battery charger into operation based on the results of the detection.

What is claimed is:

1. A battery charger for a portable electronic device, comprising:
   a power supply;
   a power supply line connected to the power supply;
   a ground line connected to the power supply;
   a USB connector comprising a Vbus terminal;
   a switching device connected between the power supply line and the Vbus terminal; and
   a controller configured to:
      perform a first detection to detect a change in a voltage at the Vbus terminal by outputting a first voltage to the Vbus terminal from a voltage output portion of the controller while the switching device is open and terminating the outputting of the first voltage, to judge whether the portable electronic device is connected to the USB connector based on a result of the first detection, wherein the first detection is performed after the terminating of the outputting of the first voltage;
      turn on the switching device when the controller judges that the portable electronic device is connected to the USB connector;
      perform a second detection to detect a change in the voltage at the Vbus terminal by outputting a second voltage that is different from the first voltage to the Vbus terminal and then terminating the outputting of the second voltage to and determining whether the voltage at the Vbus terminal changes from the second voltage when the controller judges that the portable electronic device is not connected to the USB connector based on the result of the first detection, and judges whether the portable electronic device is connected to the USB connector based on a result of the second detection; and
      turn on the switching device when the controller judges that the portable electronic device is connected to the USB connector.

2. The battery charger for the portable electronic device of claim 1, wherein the controller judges that the portable electronic device is connected to the USB connector when the voltage at the Vbus terminal changes from the first voltage by a predetermined amount of voltage after outputting the first voltage to the Vbus terminal.

3. The battery charger for the portable electronic device of claim 1, wherein the ground line is connected to a ground terminal of the USB connector, and the controller judges whether the portable electronic device is disconnected from the USB connector based on a current flowing through the ground line.

4. The battery charger for the electronic device of claim 1, wherein the ground line is connected to a ground terminal of the USB connector, and the controller judges whether charging a rechargeable battery in the portable electronic device is completed based on a current flowing through the ground line.

5. The battery charger for the portable electronic device of claim 1, further comprising a resistance bridge circuit comprising first and second resistors connected in series and third and fourth resistors connected in series and a voltage output portion outputting a voltage to a connecting node between the second and fourth resistors, wherein an end of the first resistor and an end of the third resistor are connected to the ground line, a connecting node between the first and second resistors is connected to a first data communication terminal of the USB connector and a connecting node between the third and fourth resistors is connected to a second data communication terminal of the USB terminal.

6. The battery charger for the portable electronic device of claim 1, further comprising a DC-DC converter converting an output voltage of the power supply into a desired voltage and outputting the desired voltage to the Vbus terminal through the switching device, wherein the controller puts the DC-DC converter into operation when the controller judges that the portable electronic device is connected to the USB connector.

7. The battery charger for the portable electronic device of claim 1, wherein the power supply comprises a relay switching between turning on and off of an AC power supply, a rectifier rectifying an AC voltage supplied through the relay, a DC-DC converter converting an output voltage of the rectifier into a predetermined DC voltage and a backup capacitor being charged through the DC-DC converter, wherein the controller operates on a voltage of the backup capacitor and charges the backup capacitor through the rectifier and the DC-DC converter by turning the relay on when the voltage of the backup capacitor is reduced to a voltage lower than a predetermined voltage.

8. The battery charge for the portable electronic device of claim 7, wherein the controller puts the DC-DC converter into operation by turning the relay on when the controller judges that the portable electronic device is connected to the USB connector.

9. A battery charging circuit, comprising:
a power supply having a power supply line and a ground line connected to the power supply;
a USB connector having a Vbus terminal and a ground terminal, the ground terminal connected to the ground line;
a switching device connected between the power supply line and the Vbus terminal; and
a controller that performs:
a first detection while the switching device is off to detect a change in a voltage at the Vbus terminal by providing a high voltage to the Vbus terminal from a voltage output portion of the controller for a preselected time period and terminating the outputting of the high voltage and then removing the high voltage at the end of the preselected time period, wherein after the preselected period of time, the voltage output portion is placed in a high impedance state and when the Vbus changes from the high voltage to a low voltage when the voltage output portion is placed in the high impedance state the controller turns the switching device on and commences a charging procedure; and
a second detection while the switching device is off to detect a change in a voltage at the Vbus terminal by providing a low voltage to the Vbus terminal from the voltage output portion of the controller for a preselected time period and terminating the outputting of the low voltage and then removing the low voltage at the end of the preselected time period, wherein after the preselected period of time the voltage output portion is placed in a high impedance state and when the Vbus changes from the low voltage to a high voltage when the voltage output portion is placed in the high impedance state the controller turns the switching device on and commences a charging procedure.

10. The battery charger of claim 9, wherein the power supply is a rechargeable battery.

11. The battery charger of claim 9, wherein the controller judges whether charging is completed based on a current flowing through the ground line.

12. The battery charger of claim 9, further comprising a resistance bridge circuit comprising first and second resistors connected in series and third and fourth resistors connected in series and the voltage output portion outputting a voltage to a connecting node between the second and fourth resistors, wherein an end of the first resistor and an end of the third resistor are connected to the ground line, a connecting node between the first and second resistors is connected to a first data communication terminal of the USB connector and a connecting node between the third and fourth resistors is connected to a second data communication terminal of the USB terminal.

13. The battery charger of claim 9, further comprising a DC-DC converter converting an output voltage of the power supply into a desired voltage and outputting the desired voltage to the Vbus terminal through the switching device when the switching device is turned on, wherein the controller puts the DC-DC converter into operation to commence the charging procedure.

14. The battery charger of claim 9, wherein the power supply comprises a relay switching between turning on and off of an AC power supply, a rectifier rectifying an AC voltage supplied through the relay, a DC-DC converter converting an output voltage of the rectifier into a predetermined DC voltage and a backup capacitor being charged through the DCDC converter, wherein the controller operates on a voltage of the backup capacitor and charges the backup capacitor through the rectifier and the DC-DC converter by turning the relay on when the voltage of the backup capacitor is reduced to a voltage lower than a predetermined voltage.

15. A method of charging a battery of a portable electronic device by a charger having a switching device coupled between a power supply and a Vbus terminal, comprising:
a controller applying a high voltage to the Vbus terminal while the switching device is off from a voltage output portion of the controller, the high voltage being above a threshold level;
removing the first voltage from the Vbus terminal and placing the voltage output portion into a high impedance state while the switching device is off;
detecting the voltage at the Vbus terminal after applying and removing the first voltage at the Vbus terminal and when the voltage at the Vbus terminal changes to a level below the threshold level the charger commences a charging procedure by switching the switching device on;

applying a low voltage to the Vbus terminal while the switching device is off from the voltage output portion of the controller, the low voltage being below the threshold level;

removing the second voltage from the Vbus terminal and placing the voltage output portion into a high impedance state while the switching device is off; and detecting the voltage at the Vbus terminal after applying and removing the second voltage at the Vbus terminal and when the voltage at the Vbus terminal changes to a level above the threshold level, while the switching device is off, the charger commences a charging procedure by switching the switching device on.

16. The method of claim 15, further comprising waiting a preselected period of time before the controller applying the first voltage to the Vbus terminal.

17. The method of claim 15, further comprising, upon commencing the charging procedure, applying voltage to a first data communication terminal and a second data communication terminal.

18. A battery charging circuit, comprising:
a power supply line and a ground line for connection to a power supply;
an output terminal having a Vbus terminal and a ground terminal, the ground terminal connected to the ground line;
a switching device connected between the power supply line and the Vbus terminal; and
a controller that:
performs a first detection while the switching device is off to detect a change in a voltage at the Vbus terminal by outputting a first voltage to the Vbus terminal and subsequently determining whether the Vbus terminal changes from a high voltage to a low voltage;
selectively performs a second detection while the switching device is off to detect a change in a voltage at the Vbus terminal by providing a low voltage to the Vbus terminal and determining whether the Vbus changes from the low voltage to the high voltage; and
turns on the switching device when the controller judges that a portable electronic device is connected to the output terminal in response to one of the first and second detections.

19. The battery charging circuit of claim 18 wherein the controller, as a part of performing the first detection, provides a high voltage to the Vbus terminal from a voltage output portion of the controller for a preselected time period and terminating the outputting of the high voltage and then removing the high voltage at the end of the preselected time period, wherein after the preselected time period the voltage output portion is placed in a high impedance state.

20. The battery charging circuit of claim 18 wherein the controller, as a part of performing the second detection, applies the low voltage for a preselected time period and terminates the outputting of the low voltage and then removes the low voltage at the end of the preselected time period, wherein after the time preselected period a voltage output portion is placed in a high impedance state and then determines if a voltage level of the Vbus terminal increases.

21. The battery charging circuit of claim 18, further comprising:
a USB connector coupled to the output terminal.

* * * * *